(12) United States Patent
Wildeson et al.

(10) Patent No.: US 8,398,810 B2
(45) Date of Patent: Mar. 19, 2013

(54) ADHESIVE FOR FLOOR COVERINGS

(75) Inventors: Jacob Wildeson, Charlotte, NC (US);
Alexander Centner, Roedersheim-Gronau (DE); Horst Seibert, Fussgoenheim (DE)

(73) Assignee: BASF SE, Ludwigshafen (DE)

( * ) Notice: Subject to any disclaimer, the term of this patent is extended or adjusted under 35 U.S.C. 154(b) by 318 days.

(21) Appl. No.: 12/302,804

(22) PCT Filed: Jun. 1, 2007

(86) PCT No.: PCT/EP2007/055374
§ 371 (c)(1),
(2), (4) Date: Nov. 28, 2008

(87) PCT Pub. No.: WO2007/141198
PCT Pub. Date: Dec. 13, 2007

(65) Prior Publication Data
US 2009/0199965 A1 Aug. 13, 2009

(30) Foreign Application Priority Data

Jun. 9, 2006 (EP) .................................... 06115246

(51) Int. Cl.
*B32B 7/12* (2006.01)
*B22F 1/00* (2006.01)
*C09D 11/02* (2006.01)

(52) U.S. Cl. ............................. 156/327; 524/1; 524/270

(58) Field of Classification Search ................... 156/327; 524/1, 270
See application file for complete search history.

(56) References Cited

U.S. PATENT DOCUMENTS

| 3,740,355 | A | | 6/1973 | Klug | |
|---|---|---|---|---|---|
| 5,534,571 | A | * | 7/1996 | Aydin et al. | 524/272 |
| 5,935,312 | A | * | 8/1999 | Krieger | 106/220 |
| 6,169,132 | B1 | * | 1/2001 | Fickeisen et al. | 524/271 |
| 6,248,159 | B1 | * | 6/2001 | Poppen et al. | 106/15.05 |
| 6,409,860 | B1 | | 6/2002 | Fickeisen et al. | |
| 6,593,421 | B2 | | 7/2003 | Christie et al. | |
| 6,706,789 | B2 | | 3/2004 | Ddamulira et al. | |
| 2003/0073765 | A1 | * | 4/2003 | Ddamulire et al. | 524/115 |

FOREIGN PATENT DOCUMENTS

| DE | 39 24 047 A1 | 1/1991 |
|---|---|---|
| EP | 0 326 530 | 8/1989 |
| EP | 0 701 822 A2 | 3/1996 |
| EP | 0743965 | 11/1996 |
| EP | 1 201 691 A1 | 5/2002 |
| WO | WO 95/21884 | 8/1995 |

* cited by examiner

*Primary Examiner* — Michael Orlando
(74) *Attorney, Agent, or Firm* — Oblon, Spivak, McClelland, Maier & Neustadt, L.L.P.

(57) ABSTRACT

An aqueous composition comprising
a) a polymer obtainable by free-radical polymerization
b) a tricyclic diterpene derivative or a mixture of tricyclic diterpene derivatives (referred to collectively as tricyclic diterpene for short)
c) a metal salt of an organic acid
d) if appropriate filler.

18 Claims, No Drawings

ADHESIVE FOR FLOOR COVERINGS

The invention relates to an aqueous composition comprising:
a) a polymer obtainable by free-radical polymerization
b) a tricyclic diterpene derivative or a mixture of tricyclic diterpene derivatives (referred to collectively as tricyclic diterpene for short)
c) a metal salt of an organic acid
d) if appropriate filler.

The invention further relates to the use of the composition as an adhesive, especially for the adhesive bonding of floorcoverings.

Aqueous adhesives for floorcoverings generally comprise a polymeric binder and fillers.

EP-A 743 965 and EP-A 1 201 691 disclose such adhesives which are free of organic solvents or plasticizers.

U.S. Pat. No. 6,706,789 discloses adhesives for floorcoverings, which comprise a crosslinker having oxazoline groups; the adhesives may additionally also comprise drying oils (i.e. unsaturated oils) and metal carboxylates as drying accelerants. The oxazoline groups bring about crosslinking of the binder; the metal carboxylates additionally catalyze crosslinking (drying) of the drying oils.

The adhesives according to U.S. Pat. No. 6,706,789 therefore comprise one two crosslinking systems and a multitude of components.

What is desired is a simpler crosslinking system which has at least equally good performance properties.

In the case of flexible floorcoverings, good green strength and open time are of significance for performance characteristics. Good green strength means that the carpet backing, after being laid onto the substrate coated with the adhesive, can at first be aligned and the position can be corrected, but then there is soon slip-free adhesive bonding whose strength increases as drying continues.

Good open time means that, even after prolonged venting time, a carpet backing, after being laid on the substrate which is already dry by that stage, gives rise to a strong bond.

What are therefore desired are adhesives which satisfy the aforementioned requirements as well as possible.

Accordingly, we have found the composition defined at the outset. We have also found the use of the composition as an adhesive, especially as an adhesive for floorcoverings.

The aqueous composition comprises at least the following constituents:
a) a polymer obtainable by free-radical polymerization
b) a tricyclic diterpene derivative or a mixture of tricyclic diterpene derivatives (referred to collectively as tricyclic diterpene for short)
c) a metal salt of an organic acid
d) if appropriate filler.

Polymer a)

The polymer is obtainable by free-radical polymerization of ethylenically unsaturated compounds (monomers).

The polymer consists preferably to an extent of at least 40% by weight, preferably to an extent of at least 60% by weight, more preferably to an extent of at least 80% by weight, of main monomers.

The main monomers are selected from $C_1$-$C_{20}$-alkyl (meth)acrylates, vinyl esters of carboxylic acids comprising up to 20 carbon atoms, vinylaromatics having up to 20 carbon atoms, ethylenically unsaturated nitriles, vinyl halides, vinyl ethers of alcohols comprising from 1 to 10 carbon atoms, aliphatic hydrocarbons having from 2 to 8 carbon atoms and one or two double bonds, or mixtures of these monomers.

Alkyl (meth)acrylates include, for example, alkyl (meth)acrylates having a $C_1$-$C_{10}$-alkyl radical, such as methyl methacrylate, methyl acrylate, n-butyl acrylate, ethyl acrylate and 2-ethylhexyl acrylate.

In particular, mixtures of the alkyl (meth)acrylates are also suitable.

Vinyl esters of carboxylic acids having from 1 to 20 carbon atoms are, for example, vinyl laurate, vinyl stearate, vinyl propionate, vinyl versatate and vinyl acetate.

Useful vinylaromatic compounds include vinyltoluene, a- and p-methylstyrene, a-butylstyrene, 4-n-butylstyrene, 4-n-decylstyrene and preferably styrene. Examples of nitriles are acrylonitrile and methacrylonitrile.

The vinyl halides are chlorine-, fluorine- or bromine-substituted ethylenically unsaturated compounds, preferably vinyl chloride and vinylidene chloride.

Vinyl ethers include, for example, vinyl methyl ether or vinyl isobutyl ether. Preference is given to vinyl ethers of alcohols comprising from 1 to 4 carbon atoms.

Hydrocarbons having from 2 to 8 carbon atoms and one or two olefinic double bonds include ethylene, propylene, butadiene, isoprene and chloroprene.

Preferred main monomers are the $C_1$- to $C_{20}$-alkyl acrylates and methacrylates, especially $C_1$- to $C_{10}$-alkyl acrylates and methacrylates, and vinyl aromatics, especially styrene, and mixtures of the alkyl (meth)acrylates with styrene.

Very particular preference is given to methyl acrylate, methyl methacrylate, ethyl acrylate, n-butyl acrylate, n-hexyl acrylate, octyl acrylate and 2-ethylhexyl acrylate, styrene, and mixtures of these monomers.

The polymer more preferably consists to an extent of at least 40% by weight, in particular at least 60% by weight and most preferably to an extent of at least 80% by weight, of $C_1$-$C_{20}$-, especially $C_1$-$C_{10}$-alkyl (meth)acrylates.

In addition to the main monomers, the polymer may comprise further monomers, for example monomers having carboxylic acid, sulfonic acid or phosphonic acid groups. Preference is given to carboxylic acid groups. Examples include acrylic acid, methacrylic acid, itaconic acid, maleic acid or fumaric acid.

Further monomers are, for example, also monomers comprising hydroxyl groups, especially $C_1$-$C_{10}$-hydroxyalkyl (meth)acrylates, (meth)acrylamide.

Further monomers additionally include phenyloxyethyl glycol mono(meth)acrylate, glycidyl acrylate, glycidyl methacrylate, amino (meth)acrylates such as 2-aminoethyl (meth)acrylate.

Further monomers also include crosslinking monomers.

The polymer most preferably comprises from 0.1 to 5% by weight of monomers with carboxylic acid groups.

The glass transition temperature of the polymer is preferably from −60 to 0° C., more preferably from −60 to −10° C. and most preferably from −60 to −20° C.

The glass transition temperature can be determined by customary methods such as differential thermoanalysis or differential scanning calorimetry (see, for example, ASTM 3418/82, mid-point temperature).

In a preferred embodiment, the polymers are prepared by emulsion polymerization; it is therefore an emulsion polymer.

The preparation can, however, for example, also be effected by solution polymerization and subsequent dispersion in water.

In the emulsion polymerization, ionic and/or nonionic emulsifiers and/or protective colloids or stabilizers may be used as interface-active compounds.

A comprehensive description of suitable protective colloids can be found in Houben-Weyl, Methoden der organischen Chemie [Methods of organic chemistry], Volume XIV/1, Makromolekulare Stoffe [Macromolecular substances], Georg-Thieme-Verlag, Stuttgart, 1961, p. 411 to 420. Useful emulsifiers are anionic, cationic and nonionic emulsifiers. The accompanying interface-active substances used are preferably exclusively emulsifiers whose molecular weight, in contrast to the protective colloids, is typically below 2000 g/mol. In the case of use of mixtures of interface-active substances, the individual components of course have to be compatible with one another, which can be checked in the case of doubt with the aid of a few preliminary experiments. The interface-active substances used are preferably anionic and nonionic emulsifiers. Useful accompanying emulsifiers are, for example, ethoxylated fatty alcohols (EO: 3 to 50, alkyl radical: $C_8$ to $C_{36}$), ethoxylated mono-, di- and trialkylphenols (EO: 3 to 50, alkyl radical: $C_4$ to $C_9$), alkali metal salts of dialkyl esters of sulfosuccinic acid, and alkali metal and ammonium salts of alkyl sulfate (alkyl radical: $C_8$ to $C_{12}$), of ethoxylated alkanols (EO: 4 to 30, alkyl radical: $C_{12}$ to $C_{18}$), of ethoxylated alkylphenols (EO: 3 to 50, alkyl radical: $C_4$ to $C_9$), of alkylsulfonic acids (alkyl radical: $C_{12}$ to $C_{18}$) and of alkylarylsulfonic acids (alkyl radical: $C_9$ to $C_{18}$).

Further suitable emulsifiers are compounds of the general formula II

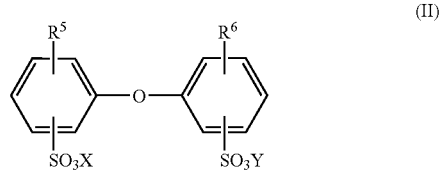

in which $R^5$ and $R^6$ are each hydrogen or $C_4$- to $C_{14}$-alkyl and are not simultaneously hydrogen, and X and Y may each be alkali metal ions and/or ammonium ions. $R^5$, $R^6$ are preferably each linear or branched alkyl radicals having from 6 to 18 carbon atoms or a hydrogen and especially having 6, 12 and 16 carbon atoms, where $R^5$ and $R^6$ are not both simultaneously hydrogen. X and Y are preferably sodium, potassium or ammonium ions, particular preference being given to sodium. Particularly advantageous compounds II are those in which X and Y are each sodium, $R^5$ is a branched alkyl radical having 12 carbon atoms and $R^6$ is hydrogen or $R^5$. Frequently, technical mixtures which have a content of from 50 to 90% by weight of the monoalkylated product are used, for example Dowfax® 2A1 (trademark of Dow Chemical Company).

Suitable emulsifiers can also be found in Houben-Weyl, Methoden der organischen Chemie, Volume 14/1, Makromolekulare Stoffe, Georg Thieme Verlag, Stuttgart, 1961, pages 192 to 208.

Trade names of emulsifiers are, for example, Dowfax® 2 A1, Emulan® NP 50, Dextrol® OC 50, Emulgator 825, Emulgator 825 S, Emulan® OG, Texapon® NSO, Nekanil® 904 S, Lumiten® I-RA, Lumiten E 3065, Disponil FES 77, Lutensol AT 18, Steinapol VSL, Emulphor NPS 25.

The interface-active substance is typically used in amounts of from 0.1 to 10% by weight, based on the monomers to be polymerized.

Water-soluble initiators for the emulsion polymerization are, for example, ammonium and alkali metal salts of peroxodisulfuric acid, for example sodium peroxodisulfate, hydrogen peroxide or organic peroxides, for example tert-butyl hydroperoxide.

Reduction-oxidation (redox) initiator systems are also suitable.

The redox initiator systems consist of at least one, usually inorganic, reducing agent and an inorganic or organic oxidizing agent.

The oxidation component comprises, for example, the initiators already mentioned above for the emulsion polymerization.

The reduction component comprises, for example, alkali metal salts of sulfurous acid, for example sodium sulfite, sodium hydrogensulfite, alkali metal salts of disulfurous acid, such as sodium disulfite, bisulfite addition compounds of aliphatic aldehydes and ketones, such as acetone bisulfite, or reducing agents such as hydroxymethanesulfinic acid and salts thereof, or ascorbic acid. The redox initiator systems may be used with additional use of soluble metal compounds whose metallic component can occur in a plurality of valence states.

Typical redox initiator systems are, for example, ascorbic acid/iron(II) sulfate/sodium peroxodisulfate, tert-butyl hydroperoxide/sodium disulfite, tert-butyl hydroperoxide/sodium hydroxymethanesulfinic acid. The individual components, for example the reduction component, may also be mixtures, for example a mixture of the sodium salt of hydroxymethanesulfinic acid and sodium disulfite.

The compounds mentioned are usually used in the form of aqueous solutions, the lower concentration being determined by the amount of water acceptable in the dispersion and the upper concentration by the solubility of the compound in question in water. In general, the concentration is from 0.1 to 30% by weight, preferably from 0.5 to 20% by weight, more preferably from 1.0 to 10% by weight, based on the solution.

The amount of the initiators is generally from 0.1 to 10% by weight, preferably from 0.5 to 5% by weight, based on the monomers to be polymerized. It is also possible for a plurality of different initiators to find use in the emulsion polymerization.

In the polymerization, it is possible to use regulators, for example in amounts of from 0 to 0.8 part by weight based on 100 parts by weight of the monomers to be polymerized, by means of which the molar mass is decreased. Examples of suitable compounds are those having a thiol group, such as tert-butyl mercaptan, ethylacryloyl thioglycolate, mercaptoethanol, mercaptopropyltrimethoxysilane or tert-dodecyl mercaptan.

The emulsion polymerization is effected generally at from 30 to 130° C., preferably from 50 to 90° C. The polymerization medium may consist either only of water or of mixtures of water and liquids miscible therewith, such as methanol. Preference is given to using only water. The emulsion polymerization can be performed either as a batch process or in the form of a feed process, including stages or gradient methods. Preference is given to the feed process in which a portion of the polymerization batch is initially charged and heated to the polymerization temperature, polymerization is commenced and then the remainder of the polymerization batch, typically via a plurality of spatially separate feeds of which one or more comprises the monomers in pure or in emulsified form, is fed to the polymerization zone continuously, stepwise or with superimposition of a concentration gradient while maintaining the polymerization. In the polymerization, it is also possible, for example, to initially charge a polymer seed for better adjustment of the particle size.

The way in which the initiator is added to the polymerization vessel in the course of the free-radical aqueous emulsion polymerization is known to the average person skilled in the art. It can either be initially charged fully into the polymerization vessel or be added continuously or in stages according to its consumption in the course of the free-radical aqueous emulsion polymerization. Specifically, this depends upon the chemical nature of the initiator system and on the polymerization temperature. Preference is given to initially charging a portion and to supplying the remainder to the polymerization zone according to the consumption.

To remove the residual monomers, typically also after the end of the actual emulsion polymerization, i.e. after a conversion of the monomers of at least 95%, initiator is added.

The individual components can be added to the reactor in the feed process from the top, in the side or from below through the reactor bottom.

The emulsion polymerization affords aqueous dispersions of the polymer, generally with solids contents of from 15 to 75% by weight, preferably from 40 to 75% by weight.

In the context of the present invention, preference is given to a solids content of from 50 to 75% by weight, in particular from 55 to 75% by weight.

For a high space-time yield of the reactor, preference is given to dispersions with a maximum solids content. In order to be able to achieve solids contents of >60% by weight, bi- or polymodal particle size should be established, since the viscosity otherwise becomes too high and the dispersion can no longer be handled. A new particle size generation can be obtained, for example, by adding seed (EP 81 083), by adding excess amounts of emulsifier or by adding miniemulsions. A further advantage which is associated with the low viscosity at a high solids content is the improved coating behavior at high solids contents. A new particle generation/new particle generations can be obtained at any time. It depends upon the particle size distribution desired for a low viscosity.

The polymer thus prepared is preferably used in the form of its aqueous dispersion.

b)

The composition further comprises a tricyclic diterpene derivative or a mixture of tricyclic diterpene derivatives (referred to as tricyclic diterpene for short).

Terpenes are hydrocarbons having 10 carbon atoms (two isoprene units); diterpenes are hydrocarbons having 20 carbon atoms (4 isoprene units). In the tricyclic diterpene, the 4 isoprene units form a three-ring system with 3 connected aliphatic 6-membered rings and aliphatic substituents (alkyl groups and one carboxylic acid group). The preferred base structure is that of abietane.

In the tricyclic diterpene, the base structure can be modified, for example, by chemical reaction. In particular, the hydrogen atoms can be replaced by other organic groups by chemical reactions (derivatives); in particular, one possibility is an esterification of the carboxylic acid group.

The tricyclic diterpenes comprise nonaromatic double bonds; they generally comprise one or two double bonds. The double bonds may also be hydrogenated to form single bonds; the content of double bonds in the tricyclic diterpene is preferably at least 0.01 mol, more preferably at least 0.05 mol, most preferably at least 0.1 mol, or at least 0.2 mol, per 100 g of tricyclic diterpene; the maximum content in the case of two double bonds per molecule is approx. 0.6 mol/100 g of tricyclic diterpene.

The molar mass of the cyclic diterpenes is generally between 264 (C20 tricycle) and 400, depending on the number and type of the substituents.

Tricyclic diterpenes can be prepared synthetically; preference is given to using natural substances. The natural substances include in particular abietic acid, neoabietic acid, levopimaric acid, pimaric acid, isopimaric acid and palustric acid.

Abietic acid and abietic acid derivatives are also known predominantly as rosins.

Suitable mixtures are in particular also those of chemically different tricyclic diterpenes; such mixtures can be prepared in a controlled manner; it is possible in particular to use natural mixtures as occur in nature, or are obtainable by workup of natural raw materials. Mention should be made in particular of tall resin which is obtained from pines.

The tricyclic diterpene preferably has a glass transition temperature of from 0 to 90° C., more preferably from 40 to 85° C.

The amount of the tricyclic diterpene is preferably from 1 to 300 parts by weight, more preferably from 10 to 150 parts by weight and most preferably from 30 to 120 parts by weight per 100 parts by weight of polymer.

c)

The aqueous composition further comprises a metal salt of an organic acid.

Such metal salts are known as accelerants for oxidative film curing and are also known under the term "siccatives".

Useful metals include both main group and transition group metals. Examples of main group metals include the alkaline earth metals, especially calcium, but also lead. Preference is given to transition group metals: examples include iron, cobalt, vanadium and manganese. Particular preference is given to cobalt and manganese; very particular preference is given to manganese. The metal is present as the cation in the metal salt.

The organic acid is preferably a carboxylic acid which is present as the carboxylate anion in the salt. The carboxylate anion preferably has at least 4, in particular at least 6 carbon atoms, more preferably at least 8 and most preferably at least 10 carbon atoms. They may be aliphatic carboxylates, especially also cycloaliphatic carboxylates and also unsaturated aliphatic carboxylates or mixtures thereof. Useful examples include so-called naphthenic acids (these are cyclohexanecarboxylic acids, cyclopentanecarboxylic acids or mixtures thereof) or linear aliphatic fatty acids having from 8 to 24 carbon atoms, such as oleic acid or linoleic acid.

The amount of the metal salt is preferably from 0.001 to 10 parts by weight, more preferably from 0.005 to 1 part by weight and most preferably from 0.01 to 0.5 part by weight, based on the tricyclic diterpene.

d)

In a preferred embodiment, the adhesive comprises fillers.

Useful fillers are in particular inorganic fillers, more preferably white pigments. Examples include calcium carbonate or silicates. Fine ground or precipitated calcium carbonate (chalk) or quartz flour have, for example, a mean particle diameter of generally between 2 and 100 µm; however, coarser particles are also useful.

The amount of the fillers may, for example, be from 10 to 400 parts by weight per 100 parts by weight of polymer.

Further Details of the Composition

In addition to constituents a) to d), the aqueous composition may comprise further constituents; examples include thickeners, defoamers, preservatives or wetting agents and dispersing assistants.

Wetting agents are, for example, fatty alcohol ethoxylates, alkylphenolethoxylates, sulfosuccinic esters, nonylphenol ethoxylates, polyoxyethylenes/-propylenes or sodium dodecylsulfonates.

Wetting agents may be present in the aqueous composition, for example, in amounts of from 0 to 5 parts by weight, thickeners in amounts of from 0 to 10 parts by weight, preservatives in amounts of from 0 to 3 parts by weight and defoamers in amounts of from 0 to 10 parts by weight per 100 parts by weight of polymer (solid, without solvent).

For many applications, the aqueous composition is preferably essentially free, preferably free, of organic solvents and plasticizers, for example butyl acetate, toluene or phthalic esters. It therefore comprises organic compounds having a boiling point below 300° C. at standard pressure (1 bar) in amounts preferably below 0.5 part by weight, more preferably below 0.1 part by weight, most preferably below 0.05 part by weight and especially below 0.01 part by weight per 100 parts by weight of polymer (solid, without solvent). The composition more preferably satisfies the requirements of freedom from emissions, as defined by the German Association for the Control of Emissions in Products for Flooring Installation.

The emissions are determined by a chamber testing method. The flooring adhesive for the inventive composition is applied at 300 g/m² to a glass plate whose size is guided by the chamber volume. The loading of the chamber is 0.4 m² of the coated glass plate per m³ of chamber volume. The emission conditions in the stainless steel testing chamber (volume at least 125 liters) are 23° C., 50% rel. air humidity and hourly air change, which brings about an exchange of all of the air every 2 hours. After 10 days, the long-term emissions are determined. To this end, a defined volume of the air stream is passed over adsorbents. After desorption the emitted substances are determined by gas chromatography (GC-MS coupling) or by liquid chromatography. The long-term emissions are determined in mg/m³, toluene being used as the standard substance. Emitted substances whose chamber concentration is greater than 20 mg/m³ are identified and calibrated with the identified pure substance. Emitted substances whose chamber concentration is less than 20 mg/m³ are not identified individually. In these cases, calibration is effected with toluene.

The values of all substances are added up.

In the case of the inventive composition, the emission value for the total of all organic compounds is preferably not more than 1500 mg/m³ and in particular not more than 500 mg/m³.

The aqueous composition requires no content of further crosslinkers. The composition preferably does not comprise any oxazoline groups and more preferably also does not comprise any drying oils or any other crosslinkers.

The aqueous adhesive can be prepared in a simple manner, for example, by adding constituents b) to d) and, if appropriate, further additives to the aqueous polymer dispersion of the polymer obtained in the emulsion polymerization with stirring.

The solids content of the aqueous composition is preferably from 50 to 95% by weight, more preferably from 60 to 90% by weight and most preferably from 70 to 85% by weight; the water content of the aqueous composition is accordingly preferably from 5 to 50% by weight, more preferably from 10 to 40% by weight and most preferably from 15 to 30% by weight.

Use

The inventive composition is suitable in particular as an adhesive.

In particular, the composition is suitable as a one-component (1K) adhesive, i.e. as an adhesive which, before use, requires no addition of a crosslinker or other reactive compounds. The adhesive therefore already comprises all constituents needed and is storage-stable.

The inventive composition can be used for the permanent bonding of any moldings. The moldings to be bonded may consist of a wide variety of different materials, for example of wood, metal, plastics, leather, ceramic or other materials; the moldings to be bonded may also be made of the same or different materials. Such adhesives are also known as industrial adhesives or assembly adhesives.

The composition is very suitable as an adhesive for floorcoverings. Useful floorcoverings include both flexible floorcoverings such as carpet backings and inflexible floorcoverings such as parquet or laminate floors.

The floorcoverings to be adhesive-bonded are more preferably flexible floorcoverings.

Flexible floorcoverings are especially carpet backings or other floorcoverings, for example made of PVC (in designs as multilayer coverings or homogeneous coverings), foam coverings with textile substrate (for example jute), polyester web, rubber coverings, textile coverings, for example also with different backing (for example polyurethane foam, styrene-butadiene foam, textile secondary backing), needlefelt floorcoverings, polyolefin coverings or linoleum coverings.

These flexible floorcoverings may be adhesive-bonded to substrates, for example made of wood, plastic, mineral substrates such as screeding, concrete, ceramic tiles, metal substrates of the like.

The adhesive may, for example, be applied to the substrate with a toothed applicator; the floorcovering is then laid on.

The inventive use achieves a good level of performance properties, such as peeling resistance, shear resistance, green strength, open time and heat resistance. The composition, i.e. the adhesive, is simple to produce (the siccative c) only needs to be stirred in) and is readily processible in use also owing to its rheology. In particular, it is also storage-stable; skin formation on the surface of the adhesive can merely be observed even after days, if at all.

EXAMPLES

1. Preparation of the Polymers by Emulsion Polymerization

Different polymers A) were prepared by customary emulsion polymerization using a polystyrene seed (0.2 part by weight per 100 parts by weight of monomers) and 0.5 part by weight of sodium persulfate as an initiator and 1 part by weight of Disponil® FES 77 (an ethoxylated sodium sulfate, Cognis Deutschland GmbH & Co. KG, Düsseldorf) and 0.5 part by weight of Lumiten®-ISC (succinic ester, BASF AG) as emulsifiers.

The composition of the polymers is specified in Table 1:

TABLE 1

| Polymer dispersions 1 to 5 | | | | |
|---|---|---|---|---|
| Parts by weight | 1 | 2 | 3 | 4 |
| EA | | | 31.5 | |
| MA | 9 | | | 19 |
| MMA | | 10.5 | | |
| AA | 2 | 2 | 2 | 2 |
| AN | 5 | | | |
| BA | 84 | 87.5 | 66.5 | 79 |
| tDMK | 0.3 | 0.3 | 0.3 | 0.3 |
| SC % by weight | 55.6 | 54.7 | 54.9 | 54.9 |

EA: ethyl acrylate
MA: methyl acrylate
MMA: methyl methacrylate
AA: acrylic acid
AN: acrylonitrile
BA: n-butyl acrylate
tDMK: tert-dodecyl mercaptan molecular weight regulator (parts by weight per 100 parts by weight of monomers are reported)
SC: solids content

2. Composition of the Aqueous Adhesives

The polymer dispersions 1 to 5 were adjusted to a solids content of 55%, and the further constituents were added to the polymer dispersion and stirred.

The adhesives have the following composition:

| | |
|---|---|
| 27.3% by weight | of polymer dispersion, adjusted to pH 8 with NaOH |
| 9.3% by weight | of Latekol ® D solution (3% strength), (thickener, BASF AG) |
| 19.0% by weight | of abietic acid derivative (mixture of 45% by weight of Dercol M10-B, Willers, Engel & Co., Hamburg and 55% by weight of Bremasin 1205, Robert Krämer GmbH & Co. KG, Rastede) |
| 0.2% by weight | of Agitan ® 282 (defoamer, Münzing Chemie GmbH, Heilbronn) |
| 1.0% by weight | of pigment dispersant ® NL (dispersing assistant, BASF AG) |
| 43.2% by weight | of calcium carbonate (Ulmer Weiβ XM, Eduard Merkle GmbH & Co., Blaubeuren) |
| 0.1 or 0.5% by weight | of Soligen Mangan 6 ® aqua (siccative, Borchers GmbH, Langenfeld) |

II. Performance Testing

Green Strength (GS)

The adhesive is discharged with a DIN coater onto a cement fiberboard panel (20×50 cm) in the direction of take-off. Needlefelt floorcovering (NFC strips) are placed into the adhesive bed after 10 minutes and pressed on with a 2.5 kg roller by rolling back and forth 3 times. At the intervals stated, the coverings are pulled off with a release tester and the increase in the peeling resistance is determined in N 5 cm.

Open Time (OT)

The adhesive is applied with a DIN coater to a cement fiberboard panel (20×50) in takeoff direction. The amount applied is approx. 250-300 mg/m². PVC strips are placed into the adhesive bed after different times and pressed on with a 2.5 kg roller by rolling it back and forth (3×). The strips are then pulled off with a release tester and the peeling resistance is determined in N 5 cm.

Heat Resistance

Cement fiberboard panels were with a PVC floorcovering (adhesive bond surface 5×2 cm) and stored under standard climatic conditions (1 bar, 23.5° C.) for 14 days. They were then heat-treated at 50° C. in a forced-air drying cabinet for 30 minutes, then stressed in a hanging position with a 2 kg load. The time taken for the adhesive bond to separate is taken as a measure of the heat resistance.

Dynamic Shear Strength

Blocks of oak were coated with the adhesive (coater: gap width 3.3 mm, gap depth 3 mm) and adhesive-bonded overlapping one another (adhesive-bonded surface 26×23 mm) and pressed on with a 2 kilo weight for 1 minute. After the storage time specified under standard climatic conditions (1 bar, 23.5° C.) the shear strength (in N/mm²) was tested in a tensile tester.

The results are listed in Table 3.

TABLE 3

| | Dispersion | | | | | |
|---|---|---|---|---|---|---|
| | 1 | 1 | 1 | 2 | 2 | 2 |
| | Siccative in % by wt. | | | | | |
| | 0 | 0.1 | 0.5 | 0 | 0.1 | 0.5 |
| GS [N/5 cm] | | | | | | |
| 10 min | 12 | 9 | 9 | 9 | 9 | 10 |
| 15 min | 22 | 19 | 17 | 17 | 17 | 16 |
| 20 min | 29 | 26 | 28 | 24 | 23 | 25 |
| 30 min | 41 | 39 | 42 | 31 | 32 | 33 |
| OT [N/5 cm] | | | | | | |
| 10 min | 1 | 1 | 2 | 2 | 4 | 1 |
| 20 min | 5 | 5 | 10 | 4 | 3 | 9 |
| 30 min | 2 | 2 | 3 | 2 | 1 | 3 |
| 45 min | 1 | 1 | 2 | 1 | 1 | 1 |
| HR [min] | 34 | 105 | >1440 | 13 | >1440 | >1440 |
| Dynamic shear strength [N/mm²] | | | | | | |
| After storage for 7 days | 1.4 | 1.6 | 2.0 | 0.7 | 1.4 | 1.8 |
| After storage for 14 days | 1.2 | 2.9 | 2.8 | 1.0 | 1.9 | 2.7 |
| | Dispersion | | | | | |
| | 3 | 3 | 3 | 4 | 4 | 4 |
| | Siccative in % by wt. | | | | | |
| | 0 | 0.1 | 0.5 | 0 | 0.1 | 0.5 |
| GS [N/5 cm] | | | | | | |
| 10 min | 15 | 12 | 13 | 10 | 10 | 8 |
| 15 min | 24 | 19 | 21 | 22 | 17 | 12 |
| 20 min | 28 | 27 | 27 | 27 | 25 | 23 |
| 30 min | 38 | 33 | 33 | 34 | 31 | 32 |
| OT [N/5 cm] | | | | | | |
| 10 min | 1 | 1 | 3 | 2 | 1 | 1 |
| 20 min | 8 | 8 | 7 | 4 | 6 | 8 |
| 30 min | 2 | 3 | 7 | 2 | 3 | 4 |
| 45 min | 2 | 2 | 2 | 1 | 2 | 4 |
| HR [min] | 74 | >1440 | >1440 | 53 | >1440 | >1440 |
| Dynamic shear strength [N/mm²] | | | | | | |
| After storage for 7 days | 0.9 | 1.3 | 1.3 | 1.1 | 1.4 | 1.8 |
| After storage for 14 days | 0.9 | 1.8 | 2.1 | 1.1 | 2.2 | 2.4 |

The invention claimed is:

1. An aqueous composition comprising
   a) a polymer having a Tg of from −60 to 0° C. obtainable by free-radical polymerization
   wherein the polymer comprises at least 40% by weight of main reacted monomers selected from the group consisting of C1 to C20 alkyl (meth)acrylates, vinyl esters of carboxylic acids comprising up to 20 carbon atoms, vinylaromatics having up to 20 carbon atoms, ethylenically unsaturated nitriles, vinyl halides, vinyl ethers of alcohols comprising from 1 to 10 carbon atoms, aliphatic hydrocarbons having from 2 to 8 carbon atoms and one or two double bonds, and mixtures of these monomers
   b) 10 to 300 parts by weight per 100 parts by weight of polymer of a tricyclic diterpene derivative comprising abietic acid; and
   c) 0.005 to 10 parts by weight per 100 parts by weight of diterpene of a metal salt of an organic acid wherein said metal is manganese, and
   d) 10 to 400 parts by weight per 100 parts by weight of polymer of a filler
   wherein said polymer is used in the form of an aqueous dispersion and said composition has a solids content of from 50 to 95% by weight.

2. The composition according to claim 1, wherein the polymer comprises at least 40% by weight of C1 to C20 alkyl (meth)acrylates.

3. The composition according to claim 1, wherein the glass transition temperature of the polymer is from −60 to −10° C.

4. The composition according to claim 1, wherein the solids content of the aqueous polymer dispersion is from 50 to 75% by weight.

5. The composition according to claim 1, wherein the tricyclic diterpene derivative is a natural mixture of diterpenes.

6. The composition according to claim 1, wherein the tricyclic diterpene derivative has a double bond content of at least 0.01 mol per 100 g of tricyclic diterpene derivative.

7. The composition according to claim 1, wherein the metal salt is the salt of a carboxylic acid.

8. The composition according to claim 1, wherein the metal salt is the salt of a carboxylic acid having at least 6 carbon atoms.

9. The composition according to claim 1, wherein the content of organic compounds having a boiling point below 300° C. (1 bar) in the composition is less than 0.5% by weight.

10. The composition according to claim 1, which does not comprise any oxazoline groups.

11. The composition according to claim 1, which does not comprise any other crosslinkers.

12. The composition according to claim 1 in the form of an adhesive.

13. The composition according to claim 1 in the form of a one-component (1K) adhesive.

14. The composition according to claim 1, wherein the solids content of the aqueous polymer dispersion is from 55 to 70% by weight.

15. The composition according to claim 1, wherein the tricyclic diterpene derivative is tall resin.

16. The composition according to claim 1, wherein the metal salt is a carboxylate.

17. A process for adhering a floorcovering to a substrate, comprising:
  i) coating the aqueous composition according to claim 1 onto said substrate; and
  ii) applying said floorcovering onto said substrate.

18. A process for adhering a molding to a substrate, comprising:
  i) coating the aqueous composition according to claim 1 onto said substrate; and
  ii) applying said molding onto said substrate.

* * * * *